United States Patent
Hovey et al.

(10) Patent No.: US 12,230,153 B2
(45) Date of Patent: Feb. 18, 2025

(54) THEMED AERIAL VEHICLE ENTERTAINMENT PLATFORM FOR PROVIDING DYNAMICALLY-COORDINATED SHOW

(71) Applicant: DISNEY ENTERPRISES, INC., Burbank, CA (US)

(72) Inventors: Pehr L. Hovey, Highland Park, CA (US); Loyal J. Pyczynski, Valencia, CA (US); Madeline R. Zupan, Burbank, CA (US); Clare M. Carroll, Burbank, CA (US); Scott F. Watson, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 736 days.

(21) Appl. No.: 16/523,656

(22) Filed: Jul. 26, 2019

(65) Prior Publication Data
US 2021/0027638 A1    Jan. 28, 2021

(51) Int. Cl.
*B64D 47/02* (2006.01)
*G05D 1/00* (2006.01)
(Continued)

(52) U.S. Cl.
CPC ........... *G08G 5/0069* (2013.01); *B64D 47/02* (2013.01); *G05D 1/0027* (2013.01); *G05D 1/104* (2013.01);
(Continued)

(58) Field of Classification Search
CPC .. G08G 5/0069; G08G 5/0043; B64C 39/024; B64C 2201/12; B64C 2201/146; B64D 47/02; G05D 1/0027; G05D 1/104
See application file for complete search history.

(56) References Cited

U.S. PATENT DOCUMENTS 10,303,415 B1   5/2019  Ananthanarayanan et al.
2014/0231590 A1* 8/2014 Trowbridge ........... A63H 27/12
                                                244/175
(Continued)

FOREIGN PATENT DOCUMENTS

CN    104751682 A    7/2015
CN    105739531 A    7/2016
(Continued)

OTHER PUBLICATIONS

Ang et al., High-Precision Multi-UAV Teaming for the First Outdoor Night Show in Singapore (Year: 2018).*
(Continued)

*Primary Examiner* — Elaine Gort
*Assistant Examiner* — Chanmin Park
(74) *Attorney, Agent, or Firm* — Dorsey & Whtiney LLP

(57) ABSTRACT

A themed aerial vehicle entertainment system or platform useful for generating crowd-pleasing shows or displays through the use of dynamically-coordinated show systems. Instead of use of a fixed flight plan, the new entertainment platform is configured to include one or more UAVs that is enclosed within or supports thematic cladding such as the outer shell of a spacecraft or flying character, and the show is dynamically coordinated to present a cohesive performance. Onboard show effects provided by onboard or UAV supported show system components such as high brightness lights are dynamically adjusted in the new system/platform to ensure the best show appearance to the audience while providing safer operations. The dynamic adjustments may involve selecting or generating a second script or "B show" in a contingent manner based on the current location or timing of movement of the UAV along a flight plan.

17 Claims, 5 Drawing Sheets

(51) Int. Cl.
*G08G 5/00* (2006.01)
*B64U 101/24* (2023.01)

(52) U.S. Cl.
CPC ....... *G08G 5/0043* (2013.01); *B64U 2101/24* (2023.01); *B64U 2201/10* (2023.01); *B64U 2201/20* (2023.01)

(56) References Cited

U.S. PATENT DOCUMENTS

| | | |
|---|---|---|
| 2014/0233099 A1 | 8/2014 | Stark et al. |
| 2014/0236388 A1 | 8/2014 | Wong et al. |
| 2014/0249693 A1 | 9/2014 | Stark et al. |
| 2016/0033855 A1 | 2/2016 | Wong et al. |
| 2016/0214713 A1* | 7/2016 | Cragg ................... B64C 39/024 |
| 2018/0136646 A1* | 5/2018 | Gurdan ............... G08G 5/0013 |
| 2019/0112048 A1 | 4/2019 | Culver |
| 2019/0315486 A1* | 10/2019 | Martin ................... H05B 47/19 |
| 2020/0031438 A1* | 1/2020 | Moses .................... B64C 25/54 |
| 2020/0057439 A1* | 2/2020 | Green ................... B64C 39/024 |
| 2021/0163126 A1* | 6/2021 | Gray .................... B64C 39/024 |

FOREIGN PATENT DOCUMENTS

| | | | |
|---|---|---|---|
| CN | 106516112 A | 3/2017 | |
| EP | 3352041 A1 | 7/2018 | |
| WO | WO-2016033218 A1 * | 3/2016 | ............. A63H 27/00 |

OTHER PUBLICATIONS

International Search Report and Written Opinion, for Application No. PCT/US2020/041399, mailed Oct. 2, 2020.

* cited by examiner

THEMED AERIAL VEHICLE ENTERTAINMENT PLATFORM FOR PROVIDING DYNAMICALLY-COORDINATED SHOW

BACKGROUND

1. Field of the Description

The present description relates, in general, to aerial shows or displays, and, more particularly, the description relates to a new system or platform (and related operational method) adapted for providing a dynamically-coordinated show (e.g., coordinated between airborne and ground devices) to entertain guests of a facility such as a theme park, an outdoor sporting stadium, a cruise ship, and so on. The system/platform often will build upon use of unmanned aerial vehicles (UAVs) or drones (with these terms used interchangeably herein).

2. Relevant Background

There is a strong demand for new ways to provide shows or displays in the sky. These shows and displays may be provided, for example, to crowds of people visiting a theme or amusement park. In other cases, an airborne display or show is provided to sports fans before or after a sporting event or even at halftime or another break.

Many of these sky-based or airborne shows or displays have relied wholly on show systems positioned on the ground. For example, a fireworks or other pyrotechnic show may involve launching show components (e.g., exploding rockets and the like) in a choreographed manner with, in some cases, synchronization with a soundtrack (e.g., operation of a ground-based sound system). As another example, a show or display may involve a light and/or laser show that illuminates the overhead sky and/or screens and/or other objects on the ground or in the sky above the viewers. In other cases, the shows or displays have used fountains to project water in a dynamic manner, which can be choreographed and synchronized with a soundtrack, and lighting often is used to illuminate the projected water.

More recently, show and display designers have begun to attempt to use unmanned aerial vehicles (UAVs) or drones, such as quadcopters, but the results have not met all of the goals or needs of the show and display designers. Particularly, to date, the UAVs generally have been controlled through execution of a pre-programmed set of movements (e.g., to carry out a predefined flight plan) over a space. However, this has proven insufficient to ensure that the totality of the show or display is of high enough quality and appears synchronous. When more than one UAV is employed, one or more of the UAVs typically will miss one or more cues or marks (e.g., deviate in time or place from the predefined flight plan) due to factors such as weather (e.g., wind), crew timing variability (e.g., in launching each UAV or the like), variability in performance and/or timing with other show system components or live actors, UAV performance capabilities and variance over time, and presence of other participating UAVs.

Hence, there remains a need for new systems and methods for providing aerial displays or shows through the use of one-to-many UAVs or drones. Preferably, these new systems and methods will be configured to take advantage of existing and future UAV designs.

SUMMARY

In brief, a themed aerial vehicle entertainment system or platform (and corresponding methods of use) is provided to generate crowd-pleasing shows or displays through the use of dynamically-coordinated show systems. The inventors recognized that prior shows that made use of UAVs or drones were often lacking in quality or time synchronization because the UAVs or drones were typically controlled using a pre-programmed set of motions or cues (e.g., a fixed flight plan), which resulted in loss of synchronization with show systems and/or other UAVs/drones due to wind and other external factors.

The inventors recognized that instead of use of a fixed flight plan the new aerial vehicle entertainment system or platform should be configured to include one or more UAVs but that the show should be dynamically coordinated to present a cohesive performance. The need for such dynamic control was driven in part by the inventors' recognition that a UAVs position and orientation with respect to time may not be consistent for each flight, and, therefore, certain onboard show effects (e.g., effects provided by onboard or UAV supported show system components such as high brightness lights such as light emitting diodes (LEDs)) are preferably dynamically adjusted in the new system/platform to ensure the best show appearance to the audience while minimizing or eliminating any safety hazards (e.g., from direct viewing of high brightness LEDs).

More particularly, a system is described herein that is adapted for providing a themed aerial vehicle entertainment platform with dynamic aerial show coordination. The system includes an unmanned aerial vehicle (UAV) with a chassis, flight propulsion mechanisms operable to move the chassis in three dimensions, and a flight controller, which generates or receives flight control signals indicating a position of the UAV in an air space. The flight controller also controls the flight propulsion mechanisms to move the UAV chassis to locations in the space indicated by the flight control signals. The system includes a show interface(s) on the chassis and further may include thematic cladding supported by the chassis and at least partially blocking view of lower portions of the UAV when the UAV is viewed from below. An onboard show system is provided that includes show effect devices moved in the space by the UAV. The system also includes an onboard show controller in or supported by the UAV and coupled to the show interface.

In some preferred embodiments, the onboard show controller includes a show control module and memory storing a show plan, and the show control module generates show control signals based on the show plan and based on one of timing and location signals for the UAV in the space provided to the onboard show controller via the show interface. Further, in some cases, the show effect devices are actuated to generate show effects in response to receipt of the show control signals, and the thematic cladding at least partially encloses the chassis to block enclosed portions from view. In such implementations, the show effect devices can be positioned on or in the thematic cladding and include at least one of a lighting system selectively outputting light, a sound system selectively outputting sound, a pyrotechnic system selectively providing pyrotechnic effects, a projection system selectively projecting images or light, and a projectile system selectively projecting objects. Further, in such implementations, the onboard show system can be implemented in a distributed manner in both the chassis and the thematic cladding and be configured to include computational resources that communicate with each other through the show interface. Still further, in such cases, the onboard show controller can be located in the thematic cladding and receive power and data from the UAV via the show interface. Then, the onboard show controller may be connected to the onboard show system to directly control and sequence operation of the show effect devices with the show control signals.

In the same or other embodiments of the system, the show plan may include a plurality of scripts, and the onboard show controller selects a first one of the scripts to generate the show control signals based on a first comparison of the timing and location signals of the UAV with a flight plan and show effect locations and timing defined in the show plan and then selects a second one of the scripts to generate the show control signals based on a second comparison, whereby the onboard show controller provides real time show contingencies based on real time performance of the UAV in the space. In such implementations, the onboard show controller may select a third one of the scripts in response to loss of communications with a ground-based show control system, and the third one of the scripts includes operating the show effect devices to turn off or down one or more onboard lights.

In some cases, the onboard show controller receives timing and trigger signals from a ground-based show control system operating independently of the flight controller to generate the timing and trigger signals based on a location of the UAV in the space relative to a predefined geographic boundary or area. In such cases, the onboard show controller responds by generating the show control signals based on the timing and trigger signals, and the show control signals include actuating one of the show effects or modifying one of the show effects. In these cases, the modifying of the one of the show effects function may include suppressing operations of at least one of the show effect devices, whereby show appearance is preserved when the UAV is off a flight plan defined in the show plan.

DETAILED DESCRIPTION

Figure 1:
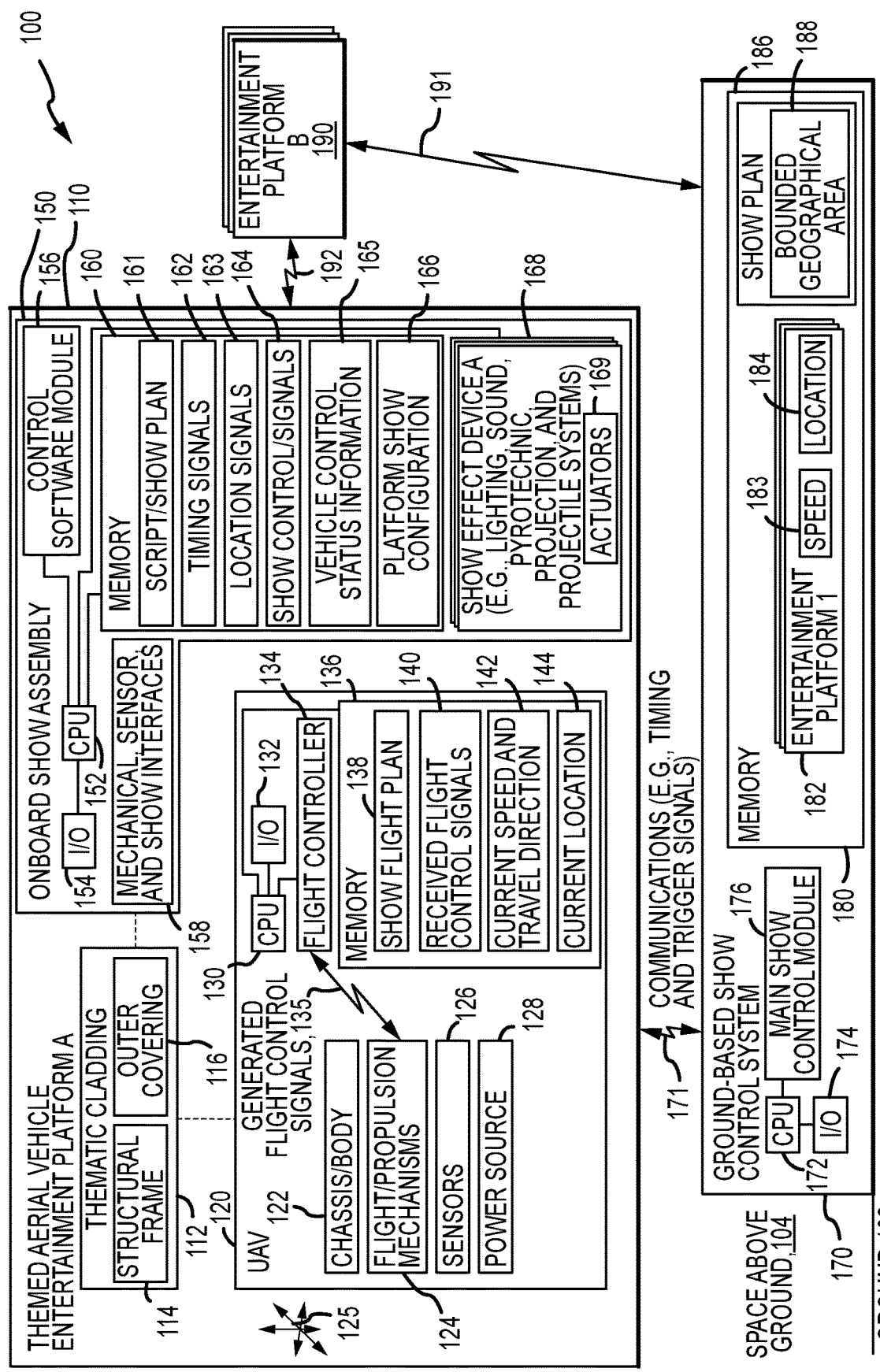
FIG. 1 illustrates a functional block diagram of a show system using themed aerial vehicle entertainment platforms according to the present description.

Briefly, a themed aerial vehicle entertainment platform or system is described herein that is particularly well-suited for providing a show or display in the sky or space above or near a group of viewers or observers below (e.g., on the ground). The aerial vehicle may take the form of nearly any UAV or drone such as a tricopter, a quadcopter, or other similar device configured for lifting and/or carrying heavier loads while other embodiments may use UAVs in the form of blimps, planes, and/or ballistic objects such that "UAV" (or "drone") is intended to be construed in a very broad sense. The aerial vehicle is "themed" because it is used to carry cladding that may disguise the presence of the aerial vehicle or change its appearance so that it does not appear to be a conventional UAV or drone, and the cladding may, for example, be tethered to the UAV to be hung below the UAV or drone or, more typically, be configured to enclose (partially or wholly) the UAV or drone. In this way, the entertainment platform or system is "themed" and can be used to present new show or display features by appearing as flying characters or objects (e.g., rockets, planes, or space ships) from animated features, films, or other media.

The themed aerial vehicle entertainment platform is configured to support or carry, e.g., in or part of the cladding or on or within the cladding, a portion of a show system. This may be considered an onboard show system/assembly, and an onboard or local show controller is provided on the UAV to control operations of the components of the onboard show system/assembly. The control may be performed by generating show control signals for the components of the onboard show system to suit a predefined show stored in local memory in a dynamic fashion based on output of a UAV controller (e.g., providing data on UAV speed, present location, and the like). Further, synchronization with other show systems may be provided through communications with other entertainment platforms (e.g., other UAVs with the same or differing cladding and show systems), with other show system components (e.g., ground-based components), and/or with a central or main show controller, which may be ground based.

Uniquely, the predefined show (e.g., a show plan with marks/cues and actions at each mark/cue or based on a time in a show as the UAV follows a flight plan) stored in local memory on the UAV may include alternate actions or show steps to perform when the UAV is determined to be deviating from the predefined show such as by flying slower than expected due to wind or UAV performance, by having another UAV or entertainment platform detected too near or spaced in an undesired manner relative to the controlled entertainment platform (e.g., too close to trigger certain lighting effects or pyrotechnic effects), and so on. In this way, the entertainment platform can continue to operate to provide a "B show" (or branch of a predefined show) or to land in a real-time manner so as to provide dynamic contingencies in the show control and/or to retain or regain synchronized operation of the entertainment platform with other show components and/or other entertainment platforms instead of simply carrying out a preprogrammed flight plan with predefined triggering events for operating onboard show system elements or components.

FIG. 1 illustrates a functional block diagram of an aerial show or display system 100 that makes use of a new themed aerial vehicle entertainment platform 110 of the present description. The platform (or system) 110 includes a UAV (or drone) 120 and thematic cladding 112, which is used to disguise the use and/or presence of the UAV 120 and/or to provide a flying show element such as a flying character or a flying object (such as a spaceship, a plane, or the like). Stated differently, the UAV 120 is configured to support the cladding 112 and to move it about in a space 104 above the ground 102 such as in three dimensions or in any direction as shown with arrows 125.

The cladding 112 may be supported via couplings (shown with dashed lines) with the UAV chassis/body 122, and the cladding 112 may include a structural frame or body 114 that is used to support an outer covering 116 (e.g., a fabric webbing, a lightweight material panel(s), and so on) stretched over or otherwise connected to the frame/body 114. The frame/body 114 and outer covering 116 are configured to provide theming to the platform 110 such as by providing the outer shape and look of a character or object from a movie while, typically, being lightweight to facilitate it being lifted and positioned (or flown about) by the UAV 120 in the airspace 104. For example, the frame/body 114 may provide the skeletal structure of a humanoid or robotic character capable of flying and the covering 116 may provide the outer "skin" of such a character. In another example, the frame/body 114 provides the size, shape, and configuration of a flying vehicle, and the outer covering 116 provides the outer panels or walls of the vehicle along with colors and other details to cause an observer on the ground 102 to perceive the theme of the platform 110 (e.g., to see the flying vehicle as if it were not a simulation of the physical vehicle). The cladding 112 may be supported below the UAV chassis/body 122 such as with wires or other tethering or the cladding 112 may be configured to wholly or at least partially enclose or wraparound the UAV chassis/body 122 and, optionally, the flight propulsion mechanisms 124.

The UAV (or UAVs) 120 may take many forms to implement the entertainment platform 110. In general, the UAV 120 may be any unmanned aerial vehicle or object including vehicles movable or propellable through the space 104, via propulsion mechanisms 124, such as ballistic objects and such as vehicles using propellers such as plane-type drones, such as blimps/balloons, and such as helicopter-type drones using 1 or more propeller such tricopters, quadcopters, and aerial vehicles with five, six, or more propellers, and propulsion for 3D movement 125 of the chassis/body 122 (and supported cladding 112) is provided by flight propulsion mechanisms (e.g., motor and propeller combinations) 124. The UAV 120 often will be chosen for its ability to support its own weight while also supporting weight (and drag during flight) of the cladding 112 and the onboard show assembly 150. The UAV 120 further includes a power source 128 (such as a battery or batteries) to power operations of the mechanisms 124 and other power-requiring components of the UAV 120. Sensors 126 are provided to sense operations of the UAV 120 including the propulsion mechanisms 124 and for determining operating parameters such as roll, pitch, and yaw of chassis/body 122, speed (and direction in some cases) of chassis/body 122, and location/position of the chassis/body 122 in the space 104.

The UAV 120 also includes a processor(s) 130 that manages communications (typically wireless) with a ground-based show control system 170 as shown with arrows 171 and with other entertainment platforms 190 of the system 100 as shown with arrows 192. Input/output (I/O) devices 132 are provided for this purpose and may include wireless transceivers and the like as is well known in the UAV industry. The UAV 120 includes memory/data storage 136 that is managed by the processor 130, and a flight controller 134 (e.g., hardware and software) also managed (or code executed) by the processor 130. The flight controller 134 processes and executes a flight plan 138 stored in memory for a particular show/display performed during operation of the system 100, and configuration and/or setting files may be provided in the plan 138 or separately in memory 136 that are per platform 110 and per show/display (e.g., configuration and/or settings to determine has the flight controller 134 and/or onboard show controller 156 (such as with data 166) reacts dynamically to the show environment). In response, the flight controller 134 may generate flight control signals 135 that are provided or communicated to the flight propulsion mechanisms 124 to cause these to operate to move 125 the UAV 110 from one location to the next along the flight path at a desired speed. The signals 135 may also be generated based on output from the sensors 126 such as based on current travel speed, direction, and 3D orientation 142 and/or current position/location 144 in the space 104 relative to desired show marks/positions and timing defined in the show flight plan 138. Further or alternatively, the signals 135 may be generated by the flight controller 134 based on received flight control signals 140 from the ground-based show control system 170 as shown with communications 171 and/or based on input from the onboard show assembly 150 and its control software module/show controller 156.

The platform 110 may include mechanical, sensor, and/or show interfaces 158 on the chassis 122 to allow the onboard show assembly 150 (or its show controller 156) to communicatively interface with the propulsion mechanisms 124, the sensors 126, and/or the flight controller 134. As can be understood from this discussion and FIG. 1, the platform 110 includes a UAV 120 with a chassis 122 housing or supporting flight propulsion mechanisms 124 capable of lift and/or movement in three dimensions as shown with arrows 125. The flight controller 134 is provided on the UAV 120 to generate and/or receive flight control signals 135 and 140, and the controller 134 is coupled to the flight propulsion mechanisms 124. The mechanisms 124 and/or sensor 126 operate to indicate an absolute or relative position 144 in the space 104, and the flight controller 134 causes the flight propulsion mechanisms 124 to move 125 the UAV chassis 122 to locations indicated by the flight control signals 135 (and signals 140), with the locations often being defined in the show flight plan 138.

The entertainment platform 110 includes an onboard show assembly 150 that is supported by the UAV 120 to move 125 with the UAV 120. The show assembly 150 includes a processor 152 managing operations of I/O devices 154 to facilitate communications with offboard devices such as communications 171 with the ground-based show control system 170 and such as communications 192 between other entertainment platforms 190 in the space 104 (e.g., other UAVs with thematic cladding to provide a show via coordinated operations with the entertainment platform 110). The processor 152 also executes code/instructions or runs software in local memory 160 to provide the functionality of an onboard show controller or control software module 156.

Particularly, the show controller 156 acts to process a script(s) or show plan 161 to generate a set of show control signals 164, which are communicated to one or more show effect devices 168 to cause their actuators 169 to operate to create a particular show effect. The assembly 150 includes interfaces 158 to the mechanisms 124, to the sensors 126, and/or the flight controller 134 to allow it to receive vehicle control status information 165 (e.g., flight speed, chassis orientation (yaw, pitch, and roll), and the like), current speed and travel direction 142, and current location 144 for the UAV 120. The show controller 156 may generate, from the script/show plan 161 or receive from the flight controller 134 or ground-based show control system 170, timing/trigger signals 162 and location signals 163, which may be used independently or in combination to create the show control signals 164.

The show plan 161 may include two or more scripts (or branches to new show segments) that may be chosen dynamically by the show controller 156 based on the timing signals 162, the location signals 163, and/or the vehicle control status information 165. In this manner, the show effect devices 168 may be operated to provide a desired show effect at predefined or dynamically selected timing and/or locations in the space 104 of the UAV 110. The show controller 156 can also generate the alternative scripts for one or more of the show effect devices in real time. The predefined scripts/branches of the show or real time-generated scripts/branches of the show (e.g., to alternative in real time) may be selected or created by the show controller 156 based on real time data such as the current location 144 of the UAV, the current speed and travel direction 142, and/or the current orientation of the UAV chassis 122 (and, therefore, of the cladding 112 and/or the show effect devices 168) as may be provided in the vehicle control status information 165 from sensors 126. In some cases, the real time data used to choose a "B," "C," or other show script or branch in a show plan 161 may include a location of nearby entertainment platform 190 in the space 104 to improve the quality of performance of the show plan 161. The memory 160 may also store a platform show configuration 166 that configures via the module 156 operations how the platform 110 will process and react to all the signals.

All or a subset of the show effect devices 168 may be provided on the UAV chassis 122 or may be provided on an interior or exterior surface of the cladding 112 such as on or visible through the outer covering 116. The show effect devices 168 each includes one or more actuators 169 that are responsive to receipt of the show control signals 164 to operate the corresponding show effect device 168 in one or more predefined manners (e.g., to illuminate in a particular brightness range and/or color, to play a soundtrack at a particular volume, to project a video or still image, to eject a particular projectile or set of projectiles, and so on). The show effect devices 169 may take a wide variety of forms to implement the entertainment platform 110 such as a lighting system (e.g., one-to-many white or colored LEDs, lasers, blacklights, and so on), a sound system with a playback device and one or more speakers, a pyrotechnic system for creating one or more pyrotechnic effects, and/or a projectile system (e.g., for releasing or ejecting projectiles such as confetti, streamers, water droplets or streams, coupons, souvenirs, and other objects).

In some implementations, the onboard show assembly 150 is implemented in a distributed fashion with some components (such as show effect devices 168, such as processor 152, memory 160, and controller 156 and the show effect devices 168, and any other combination) in the UAV chassis/body 122 and the thematic cladding 112. The onboard show system or assembly 150 includes computational resources such as processor(s) 152 and controller 156 that communicate with each other such as through the interfaces 158. The onboard show controller 156 with processor 152 (and with memory 160 in some cases) may be located wholly in or on the thematic cladding 112, and it may receive power from the power source 128 and data from the flight controller 134 (or directly from propulsion mechanisms 124 and/or sensors 126) from the host UAV chassis 122 via the interfaces 158 (e.g., through a show interface). The onboard show controller 156 may be connected to various onboard show effect devices 168 in order to directly control and sequence their operation.

In some embodiments of the platform 110, the onboard show controller 156 receives timing and trigger signals 171 from a ground-based show control system 170. To this end, the show control system 170 includes I/O devices 174 for communicating with I/O devices 154 of the onboard show assembly 150. The I/O devices 174 may be managed by a processor 172, which also executes code and/or runs software to provide functions of a main/central show control module or show controller 176. The show control system 170 further includes memory/data storage 180 storing for each entertainment platform 110 and 190 in a show system fleet a record or file 182 that stores data particular to that platform 110 or 190 such as its current speed 183 and location/position 184 in the space as well as other operating data (e.g., orientation, operating status of its show effect devices 168, and so on). The memory 180 may also store a show plan 186 defining flight paths and show scripts for each platform 110, 190 and include definitions of bounded geographical areas 188 (e.g., definitions of boundaries of a show space within space 104 and/or go and no-go spaces above the ground 102 for one or more of the platforms 110, 190). The memory 180 may also store a log of how the actual show performance differed from the pre-defined plan in order to inform and improve the development of the control systems and content authoring.

During operations of the system 100, the onboard show controller 156 may receive timing and trigger signals 171 (and as shown stored in onboard memory 162) from the ground-based show control system 170. This system 170 operates independently of the safety-critical flight controller 134 of the UAV 120 but in coordination with the real-time location 144 (and signals 163) of the UAV chassis 122. The geographic location 144 (and location signals 163) can be used to actuate show effects by operation of the show effect devices 168 with control signals 164 based on pre-programmed conditions (e.g., entering and/or exiting a specific geographic area 188) in order to synchronize with the UAV's flight path in real time. Determination by the ground-based show control system 170 or the onboard show controller 156 that the UAV 120 is exiting a bounded geographical area 188 (e.g., due to factors such as navigational imprecision) may cause the onboard show controller 156 to generate show control signals 164 to suppress or modify operations of one or more show effect devices 168 so as to preserve the overall show appearance (e.g., to turn off or dim a lighting system or to halt operation of a pyrotechnic or projector system when a UAV 120 exits a show space in space 104 or exits a predefined operational space for a particular one of the platforms 110, 190).

In some cases, the onboard show controller 156 may use vehicle control status information 165 to enhance the safe operation and recovery of the platform 110. This may involve the controller 156 using the location of nearby participating UAVs and/or entertainment platforms 190 to inhibit show actions (e.g., operations of show effect devices 168) that may pose a hazard (e.g., not activating onboard pyrotechnic effects if too close to another UAV or platform 190). In the event of an abnormal condition on the vehicle 120 such as a mechanical failure sensed by a sensor 126, the onboard show controller 156 may be configured to activate and maximize onboard lighting through operation of one or more of the show effect devices 168 to enhance visibility of the platform 110 to ground crew and bystanders during an emergency landing.

The onboard show controller 156 may have a maintenance safety mode to ensure personnel can test the system/platform 110 in close proximity without hazardous exposure to show effects from operation of one of the show effect devices (e.g., override the operation of a lighting system to reduce output of ultraviolet/black light, block operation of pyrotechnic system, and so on when in maintenance safety mode). In some embodiments, the onboard show controller 156 generates the show control signals 164 to control onboard effects (e.g., lighting systems such as those with LEDs) to indicate status of the UAV 120 in a discrete manner (e.g., a manner not readily perceived by non-crew observers on the ground 102) to maintain show quality. This can aid ground-based crew's situational awareness without being apparent to the audience, and it may be more useful when the cladding 112 obscures status indicators conventionally provided on an undercarriage or lower portions of a UAV chassis 122.

In the same or other embodiments, the onboard show controller 156 receives location information of nearby participating UAVs 190 (from the show control system 170 via communications 171 or from the UAVs/platforms 190 via communications 192), and the controller 156 processes this location data to coordinate show effect sequencing to optimize visual presentations via operation of the show effect devices 168 with show control signals 164. For example, the controller 156 may (in response to processing other UAV location data): (a) reduce, with new control signals 164, the brightness of onboard illumination (e.g., overriding a pre-programmed or previously controlled show effect provided by one or more lighting systems/show effect devices 168) when another UAV/platform 190 is in the foreground of the platform 110; and/or (b) modify, with control signals 164, the timing of pre-programmed effects based on locations of other UAVs/platforms 190 (e.g., the show controller 156 may be configured to wait until another UAV/platform 190 hits its mark before triggering an effect (operation of one of the show effect devices 168 in a particular manner) even if the other UAV/platform 190 is behind schedule).

In some implementations of the system 100, the onboard show controller 156 is adapted to utilize real-time UAV vehicle performance parameters 165 (e.g., velocity, heading, pitch, roll, yaw, and the like) to improve show quality in a real-time and automatic manner. For example, the controller 156 may (in response to processing the real-time UAV data such as status information 165): (a) dim the brightness of onboard illumination if the UAV 120 is further away from the audience than planned to maintain a sense of relative scale from the audience's perspective; (b) ramp brightness up and down automatically based on parameters like vehicle velocity to increase a sense of realism (e.g., lights 168 that depict the engine glow of a space ship may be controlled with control signals 164 to automatically glow brighter when the UAV 120 accelerates); (c) generate control signals 164 with an awareness that some lighting systems 168 onboard the UAV 120 are designed to shine only on the cladding 112 (on an inner or outer surface of the covering 116, for example) and, in response to such awareness, use the relative orientation of the UAV 120 to dynamically adjust with control signals 164 any light 168 that may become visible to the audience (rather than the cladding 112), which would be a distraction and/or a safety consideration.

In some cases, loss of communication links 171 between the ground show controller/control system 170 and the onboard show controller 156 in or on the chassis 122 (or on or in the cladding 112) may be detected by the onboard show controller 156. The response by the controller 156 may be the automatic triggering of alternative show content via operation of one or more of the show effect devices 168 that is independent of external systems (e.g., other entertainment platforms 190, ground-based or other show systems offboard the platform 110, and so on). Alternative show content may include turning off certain onboard lights 168 to create a minimally-acceptable appearance of the platform 110 or output of its show effect devices 164 (e.g., to provide a "B" show when an "A" or first show is not practical). In this way (and as discussed above with regard to operation of the onboard show controller 156), the platform 110 is useful for incorporating a second or "B" show (or third/C, fourth/D, or more show) that can be automatically started in emergency or unplanned or non-ideal situations to continue the aerial display or show without interruption.

Figure 2:
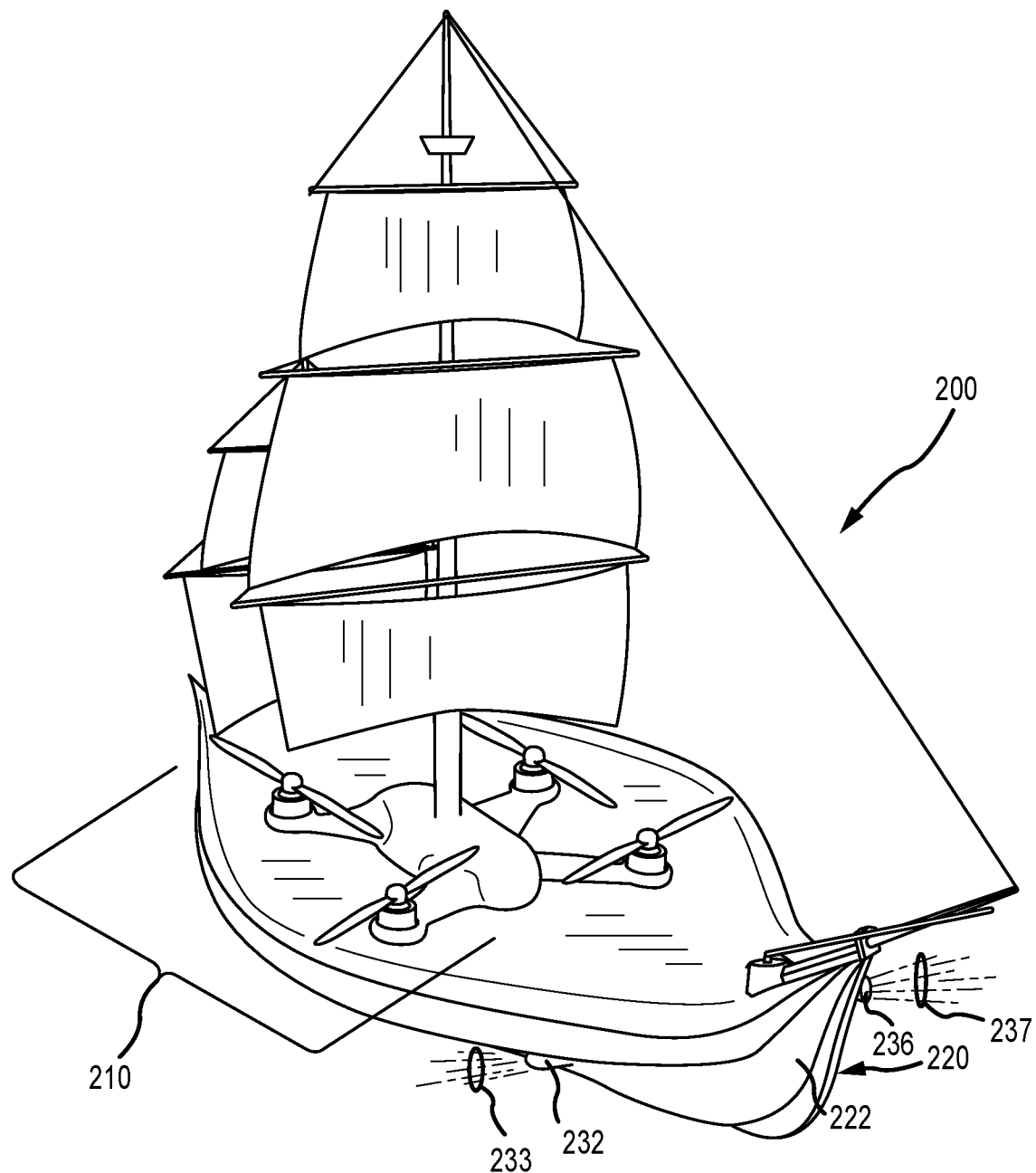
FIG. 2 is a side view of one exemplary implementation of a themed aerial vehicle entertainment platform during its use in a show or display.

FIG. 2 is a side view of one exemplary implementation of a themed aerial vehicle entertainment platform 200 during its use in an aerial show or display, the entertainment platform 200 provides one useful embodiment of the platform 110 of FIG. 1. As shown, the entertainment platform 200 includes a UAV 210 that is operable to move the entertainment platform 200 in three dimensions as shown with arrows 211. As discussed above, the UAV 210 may take a wide variety of forms with the illustrated quadcopter only being one useful but non-limiting example.

The entertainment platform 200 also includes a thematic cladding 220 with an outer coating 222 with an outer form and look that matches or emulates a flying vehicle (e.g., a flying pirate ship as shown) or spaceship, which may correspond with one from animated or live action movies, shows, or other media. The thematic cladding 220 is configured to receive and enclose (or wrap around) at least a portion of the UAV 210 so as to hide or disguise its presence in the entertainment platform 200, with the cladding 220 shown to enclose the lower half or more of chassis/body (not shown due to presence of cladding 220) of the UAV 210 so that the UAV 210 would not be readily visible to observers below the entertainment platform 200 on the ground. The movements 211 of the UAV 210 cause the interconnected or supported thematic cladding 220 to move through a space with the UAV 210 and as if the thematic cladding 220 itself is providing the required propulsion to achieve the flying/movements 211.

Further, the entertainment platform 200 includes an onboard show assembly (e.g., an implementation of assembly 150 of FIG. 1) that includes, as shown, show effect devices 232 positioned on (or extending wholly or partially through) the thematic cladding's outer surface 222 at one end or the rear of the simulated aircraft. The onboard show assembly also includes show effect devices 234 and 236 positioned on (or extending wholly or partially through) the thematic cladding's outer surface 222 at a second end or the front of the simulated aircraft. The show effect devices 232 may be high brightness lights or lighting systems such as LEDs that are operated to output light 233 that varies in brightness levels and/or colors in response to show control signals to represent engines or thrusters of the simulated aircraft being operated to accelerate, and their operations may be varied based on or to match timing of acceleration or changes in monitored speeds of movements 211 provided by the underlying UAV 210. The show effect devices 234 may be lasers outputting streams of light 235 to simulate firing of futuristic weapons on the simulated aircraft, and the devices 234 may be selectively operated with show control signals that are generated based on a monitored location of the UAV 210 as it moves through a space (hits marks at proper times).

Figure 3:
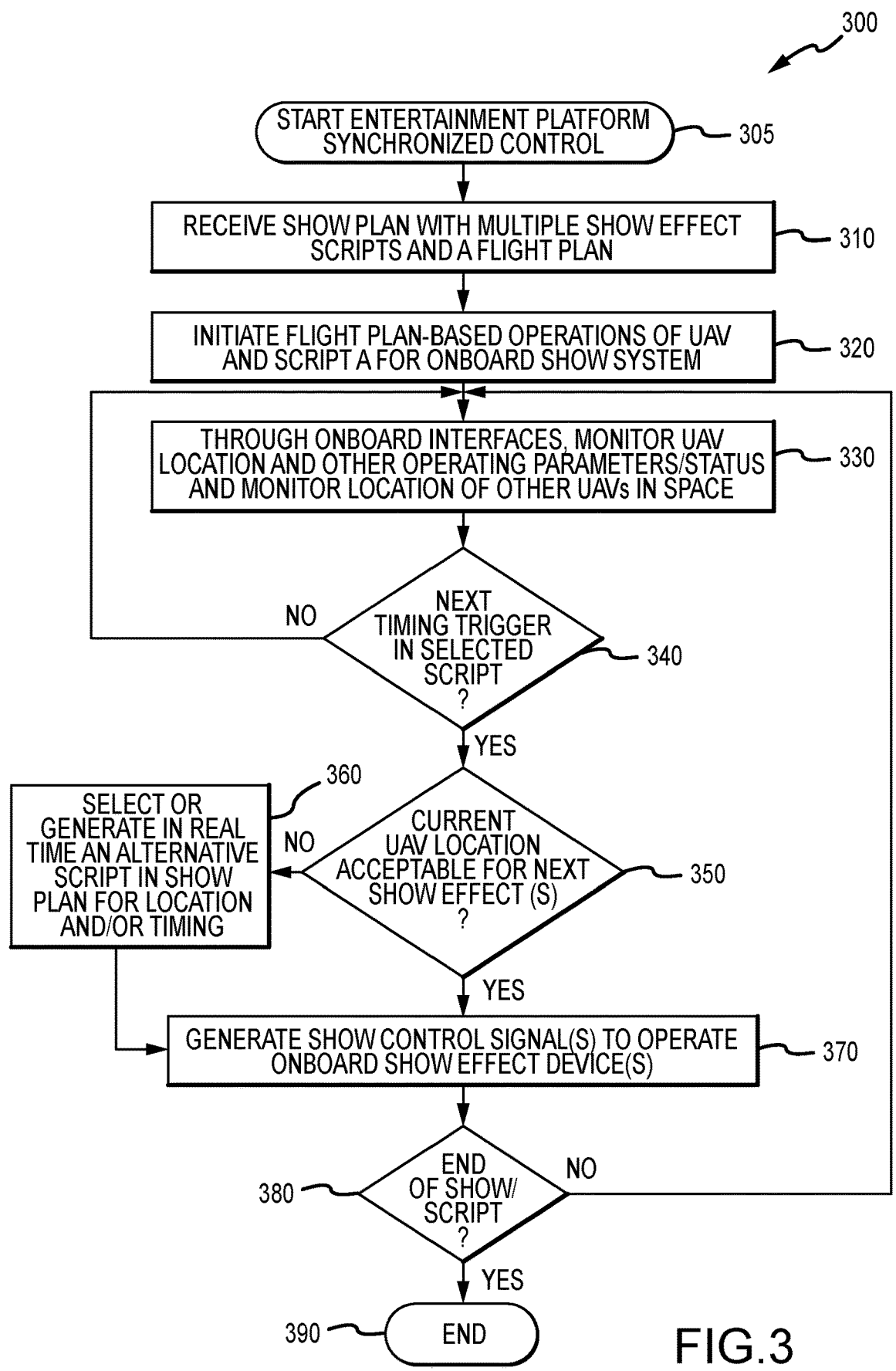
FIG. 3 is a flow diagram of a control method for operating a themed aerial vehicle entertainment platform to synchronize its operations within a show system.

FIG. 3 illustrates a flow diagram of a control method 300 for operating a themed unmanned aerial vehicle platform (such as platform 110 of FIG. 1) to provide synchronization of its operations with a show plan in a dynamic manner. The control method 300 generally will be carried out by an onboard show controller (e.g., control module 156 in FIG. 1) in combination with a UAV flight controller (e.g., flight controller 134) and/or a ground-based show control system (such as system 170 in FIG. 1). The method 300 starts at step 305 such as with selecting a UAV and thematic cladding (e.g., UAV 120 and cladding 112 of FIG. 1) for the UAV to use in a planned aerial show or display. Step 305 may also include applying the cladding to the UAV such as by coupling the cladding's support frame to the chassis/body of the UAV.

The method 300 continues at step 310 with the onboard show controller receiving, and storing in local memory, a show plan that defines multiple show effect scripts along with a flight plan for the UAV. Each show effect script defines timing triggers for show effects in an aerial show to be carried out by the entertainment platform, and the flight plan is configured to place the UAV with its thematic cladding and onboard show effect devices in proper positions in a space above observers ("marks") to perform the show effects at the predefined triggering times. The show plan includes multiple scripts because it may be useful to dynamically control the show effect devices to better synchronize these devices with UAV performance such as when the UAV varies from the flight plan or is moving slower or faster than predicted so not hitting its marks. At step 320, the method 300 continues with the flight controller of the UAV initiating operations to cause the UAV to follow or perform the flight plan and also with the onboard show controller operating the show effect devices based on a first/main or "A" script for the onboard show system. For example, the "A" script may be the most desired operation of all the show effect devices on an entertainment flight as long as the UAV is able to follow the flight plan and hit its marks in a timely manner (within a predefined time period during the show or display presentation/performance).

The method 300 continues at step 330 with the onboard show controller monitoring the UAV's location and other operating parameters or status data for the UAV. As discussed with reference to FIG. 1, the onboard show controller may receive operating and/or sensor data from interfaces (e.g., interfaces 158 in FIG. 1) providing a communication channel to the UAV's flight controller, onboard sensors, and/or propulsion mechanisms. This data includes the UAV's current position or location in a show space. At step 340, the onboard show controller determines whether a next timing trigger signal has been received (e.g., from a ground-based show control system) or has been reached in the currently selected script (e.g., the "A" script initially). If not time yet for a next show effect, the method 300 continues with repeating step 330.

If timing trigger received/reached, the method 300 continues at step 350 with the onboard show controller determining whether the current location of the UAV is within a predefined acceptable range from a predefined location in the space for the show effect corresponding with the trigger signal/timing trigger. If not (such as due to the UAV traveling slower or faster due wind conditions or a delayed launch), the method 300 continues with the onboard show controller operating to select an alternative script from the multiple scripts/show branches in the show plan stored in step 310. In other cases, the onboard show controller is configured to generate an alternative script to perform in real time based on the location of the UAV. In this manner, the onboard show controller provides dynamic synchronizing of the entertainment platform within a show system and/or provides a "B show" contingency as a second or "B" script can be chosen or created at step 360 rather than simply following the single script even when the UAV is not hitting its marks defined by the flight plan.

At step 370, the onboard show controller generates show control signals to operate one or more of the onboard show effect devices to produce one or more show effects defined in the currently selected script at the trigger time and location/mark on the flight path. The method 300 continues at step 380 with the onboard show controller determining whether the end of the show or current script has been reached. If yes, the control method 300 may end at step 390. If not, the method 300 may continue with repeating performance of step 330.

In some implementations of the method 300, the onboard show controller processes location information for nearby participating UAVs, and the controller processes this location data to coordinate show effect sequencing to optimize visual presentations via operation of the show effect devices with show control signals. For example, the onboard show controller 156 may (in response to processing other UAV location data): (a) reduce, with new control signals, the brightness of onboard illumination (e.g., overriding a pre-programmed or previously controlled show effect provided by one or more lighting systems/show effect devices) when another UAV/platform is in the foreground of the platform; and/or (b) modify, with show control signals, the timing of pre-programmed effects based on locations of other UAVs/platforms (e.g., the onboard show controller may be configured to wait until another UAV/platform hits its mark before triggering an effect (operation of one of the show effect devices in a particular manner) even if the other UAV/platform is behind schedule).

Figure 4:
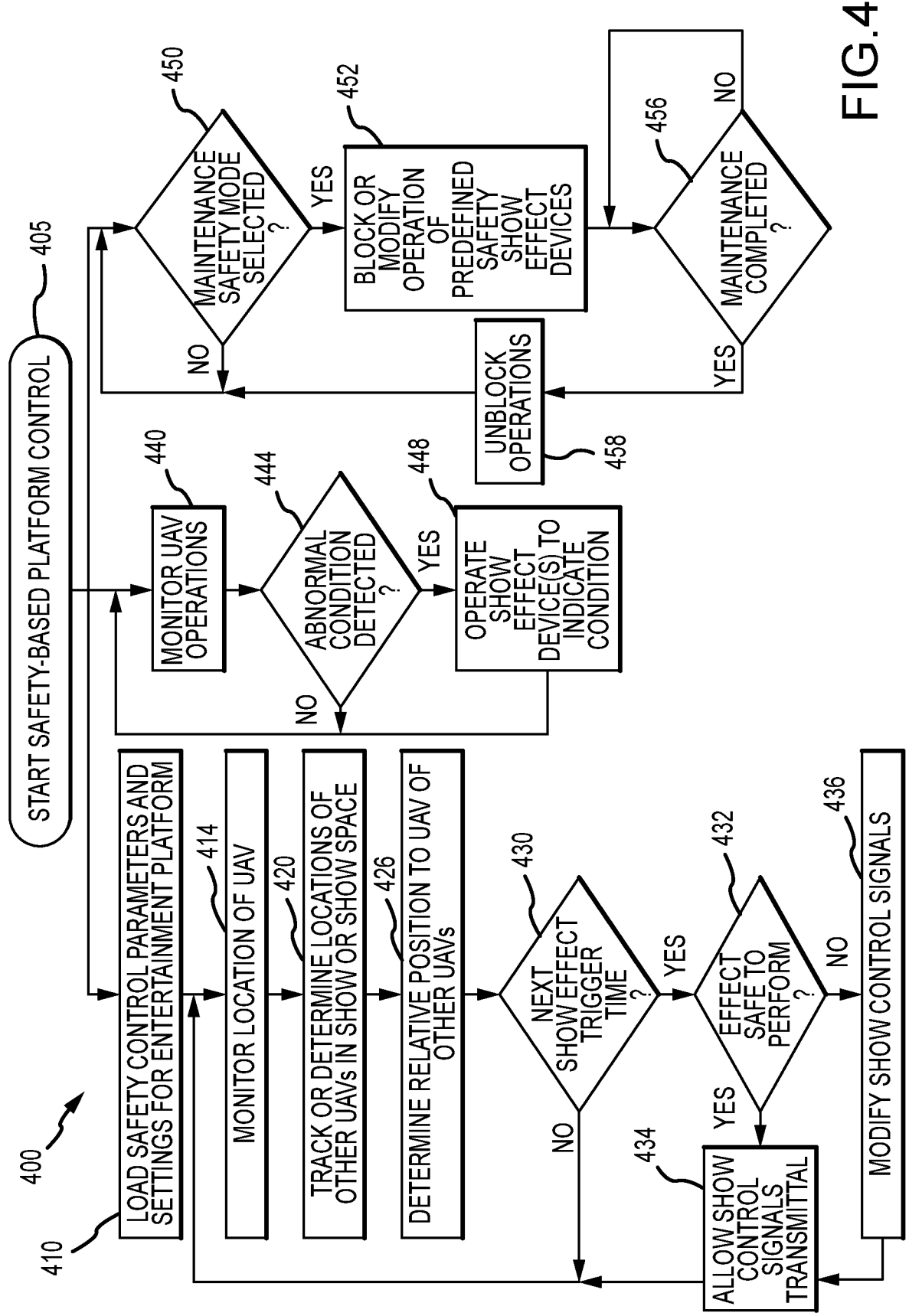
FIG. 4 is a flow diagram of a safety-based platform control method for operating a themed aerial vehicle entertainment platform.

FIG. 4 is a flow diagram of a safety-based platform control method 400 for operating a themed aerial vehicle entertainment platform to ensure safe operation of an entertainment platform of the present description. The method 400 starts at 405 such as by ensuring there is a communication interface(s) between the UAV and the onboard show controller to allow flow of vehicle control status and/or operational information (such as from sensors, from the propulsion mechanisms, and/or from the flight controller) from the UAV to the onboard show controller. The method 400 is shown to have three concurrent operations to provide safe operations of the entertainment platform, and these may be performed concurrently or in the background during performance of the method 300 of FIG. 3.

The method 400 includes step 410 in which safety control parameters and settings may be loaded into its onboard memory for use by the onboard show controller in performing later steps. This data may include minimum distances required between nearby UAVs and the present UAV to operate each show effect device, and the loaded parameters or settings may also provide predefined modifications to show effect device operation upon detection of a nearby UAV such as defining amount of reduction of operations (e.g., for lighting systems), indications of which devices cannot be operated in presence of nearby UAVs (e.g., for pyrotechnic show effect devices), and the like.

The method 400 proceeds at step 414 with the onboard show controller monitoring location of the UAV of the entertainment platform and at step 420 with tracking or determining locations of other UAVs in show or show space such as with communications with a ground-based show control system or communications with other entertainment platforms in the show (which are tracking their own locations and can provide this information to other platforms). Then, at step 426, the onboard show controller operates to determine relative positioning of nearby UAVs such as by determining the distance to each neighboring UAV and in what direction they are located relative to the current location of the entertainment platform carrying the onboard show controller.

The method 400 then involves the onboard show controller determining at step 430 whether it is time to trigger or send a show control signal to any show effect devices. If not, the method continues at step 414. If a trigger signal has been received or a trigger time detected at step 430, the method 400 continues at step 432 with the onboard show controller operating to determine whether the show effect to be triggered can be performed safely based on the locations of nearby UAVs. If yes (e.g., based on the separating distance exceeding a predefined minimum separation distance for a particular show effect device), the method continues at step 434 with allowing the show control signals to be generated and/or transmitted. If the spacing is not adequate for this show effect, the onboard show controller operates at step 436 with modifying the show control signals prior to their transmittal (or non-transmittal) at step 434. The modification can simply involve prohibiting activation of a show effect device such as a pyrotechnic show effect device if another UAV is too close. The modification may, instead, mean a reduction in the level of the operation of the show effect device such as illumination with a lighting system at a lower level, such as projecting projectiles with less force, and so on.

The method 400 also includes step 440 in which the onboard show controller monitors UAV operations such as through receipt via a mechanical or sensor interface UAV operational status information. At step 444, the onboard show controller determines whether an abnormal operating condition has been detected (such as a mechanical failure). If not, the method 400 continues at step 440. If yes, the method 400 continues at step 448 with the onboard show controller operating show effect devices to indicate to the ground crew or others the presence of the abnormal operating condition. For example, the controller may respond to detection of a mechanical failure or other operating issue by activating and maximizing all or a portion of the show effect devices that provide lighting to enhance visibility to crew and bystanders during an emergency landing situation. In another example, the abnormal operating condition may be less severe (such as a status involving low battery), and, in such case, the onboard show controller may respond by modifying show effects such as lighting (e.g., LEDs and the like) in a discrete manner that may not be apparent to an audience (such as by changing a particular light's color or illumination level (including turning one or more lights on or off)). This may be useful when conventional lights that could be used for such a purpose are hidden by the thematic cladding.

The method 400 further includes step 450 in which the onboard show controller determines whether a maintenance safety mode has been selected to allow maintenance to be safely performed on the entertainment platform. If not, the method 400 continues at 450. If yes, the method 400 continues with blocking operation of a predefined set of show effects that could possibly be hazardous to maintenance personnel if inadvertently activated such as pyrotechnic show effect devices, ultraviolet lighting devices, and the like. Then, the method 400 continues at step 456 with the onboard show controller monitoring whether the maintenance has been completed (e.g., maintenance safety mode turned off or deselected via an interface to the onboard show controller). If not, the method 400 continues with repeating step 456. If yes, the method 400 continues at 458 with unblocking operations of the previously blocked show effect devices and then with repeating step 450.

Figure 5:
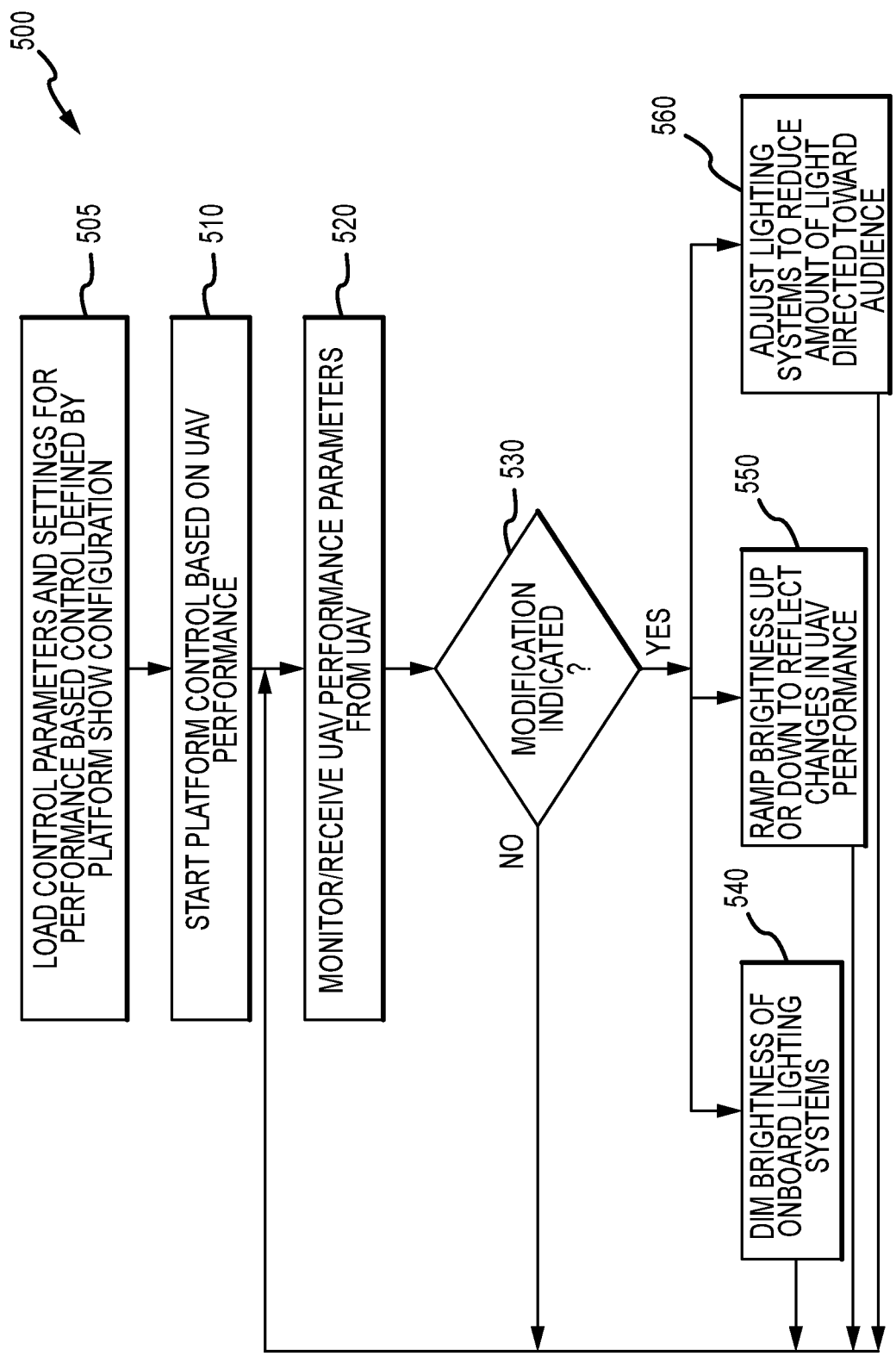
FIG. 5 is a flow diagram of a UAV performance-based control method for onboard show effect devices of an entertainment platform of the present description.

FIG. 5 is a flow diagram of a UAV performance-based control method 500 for onboard show effect devices of an entertainment platform of the present description (such as platform 110 of FIG. 1 or platform 200 of FIG. 2). As discussed above, an onboard show controller may be configured to utilize real-time UAV vehicle performance parameters to improve show quality in real-time or dynamically in an automated manner (e.g., without operator inputs during a show). The method 500 starts at step 505 such as with ensuring that the interfaces are provided between the UAV (or its components such as the propulsion mechanisms or sensors and/or the flight controller) and the onboard show controller (such as interfaces 158 shown in FIG. 1) to allow the onboard show controller to receive performance information for the UAV on an ongoing basis during a show performance. The method 500 continues at step 510 with loading control parameters and settings for performance-based control of the show effect devices, and these parameters and settings may indicate performance values for triggering changes in device control and corresponding responses to detected performance values/data.

At step 520, the method 500 involves the onboard show controller operating to monitor/receive UAV performance parameters (e.g., velocity, heading, pitch, roll, and the like) from the operating UAV during a show/display performance. Then, at step 530, the onboard show controller compares these UAV performance parameters with control parameters and/or settings loaded in step 510 to determine whether modification of one or more of the show effect devices is required or indicated. If not, the method 500 continues at step 520 with ongoing parameter monitoring. If yes, the onboard show controller may perform one or more of the control functions shown in FIG. 5.

Particularly, at step 540, the onboard show controller may dim brightness of one or more onboard lighting systems (show effect devices) such as if the UAV is further away from the audience (ground) to maintain a sense of relative scale from the audience's perspective. Alternatively or in addition, the onboard show controller may at step 550 ramp brightness up and/or down automatically based on performance parameters such as UAV velocity to increase a sense of realism (e.g., provide lights on the cladding's exterior surfaces that depict engine glow (such as devices 232 in FIG. 2) that glows brighter when the UAV accelerates and dimmer when the UAV decelerates).

Also, the onboard show controller may at 560 adjust lighting systems to reduce an amount of light directed toward the audience by dimming or turning off one or more show effect devices that output light. For example, the onboard show controller may be aware based on per-vehicle configuration input from step 510 that some lighting onboard the UAV or cladding is used to shine only on the cladding (from the inside or outside of the cladding). It may be desirable to process the relative orientation of the UAV to dynamically adjust one or more lighting devices before or as they become visible to the audience to reduce direct glare into eyes of audience members and then readjust the lighting device back to prior settings when the relative orientation again hides the presence of the lighting devices (e.g., shines light mainly on the cladding surfaces rather than the audience)).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A system adapted for providing a themed aerial vehicle entertainment platform with dynamic aerial show coordination, comprising:

an unmanned aerial vehicle (UAV) comprising a chassis, flight propulsion mechanisms operable to move the chassis in three dimensions, and a flight controller, wherein the flight controller generates or receives flight control signals indicating a position of the UAV in an air space and wherein the flight controller controls the flight propulsion mechanisms to move the UAV chassis to locations in the space indicated by the flight control signals;

a show interface on the chassis;

thematic cladding supported by the chassis wherein the thematic cladding extends around and encloses at least a lower portion of the chassis of the UAV;

an onboard show system including show effect devices moved in the space by the UAV; and an onboard show controller in or supported by the UAV and coupled to the show interface, wherein the onboard show controller includes a show control module and memory storing a show plan, wherein the show control module generates show control signals based on the show plan and based on at least one of timing and location signals for the UAV in the space provided to the onboard show controller via the show interface, wherein the show effect devices are actuated to generate show effects in response to receipt of the show control signals, wherein the show plan comprises a plurality of scripts defining timing and locations of operations of the show effect devices, and wherein the onboard show controller selects a first one of the scripts to generate the show control signals based on a first comparison of the timing and location signals of the UAV with a flight plan and show effect locations and timing defined in the show plan and then selects a second one of the scripts to generate the show control signals based on a second comparison showing the UAV deviating from either the locations or the timing defined in the show plan, whereby the onboard show controller provides real time show contingencies based on real time performance of the UAV in the space.

2. The system of claim 1, wherein the show effect devices are positioned on or in the thematic cladding and include at least one of a lighting system selectively outputting light, a sound system selectively outputting sound, a pyrotechnic system selectively providing pyrotechnic effects, a projection system selectively projecting images or light, and a projectile system selectively projecting objects and wherein the onboard show system is implemented in a distributed manner in both the chassis and the thematic cladding and comprises computational resources that communicate with each other through the show interface.

3. The system of claim 1, wherein the onboard show controller is located in the thematic cladding and receives power and data from UAV via the show interface and wherein the onboard show controller is connected to the onboard show system to directly control and sequence operation of the show effect devices with the show control signals.

4. The system of claim 1, wherein the onboard show controller selects a third one of the scripts in response to loss of communications with a ground-based show control system and wherein the third one of the scripts includes operating the show effect devices to turn off or down one or more onboard lights.

5. The system of claim 1, wherein the onboard show controller receives timing and trigger signals from a ground-based show control system operating independently of the flight controller to generate the timing and trigger signals based on a location of the UAV in the space relative to a predefined geographic boundary or area, wherein the onboard show controller responds by generating the show control signals based on the timing and trigger signals, and wherein the show control signals include actuating one of the show effects or modifying one of the show effects.

6. The system of claim 5, wherein the modifying of the one of the show effects includes suppressing operations of at least one of the show effect devices, whereby show appearance is preserved when the UAV is off a flight plan defined in the show plan.

7. A system adapted for providing a themed aerial vehicle entertainment platform with dynamic aerial show coordination, comprising:

an unmanned aerial vehicle (UAV) comprising a chassis, flight propulsion mechanisms operable to move the chassis, and a flight controller controlling the flight propulsion mechanisms to move the UAV to locations in the space;

thematic cladding coupled to and enclosing lower portions of the chassis;

an onboard show system including show effect devices in the thematic cladding; and an onboard show controller supported by the UAV, wherein the onboard show controller includes a show control module and memory storing a show plan defining a flight plan defining the locations for the UAV during performance of a show and scripts defining timing and locations of operations of the show effect devices, wherein the show control module generates a first set of show control signals based on the show plan when a location of the UAV in the space matches the timing and locations defined in a first one of the scripts and generates a second set of show control signals based on a second one of the scripts when the location of the UAV in the space deviates a predefined amount from the timing and locations defined in the first one of the scripts, and wherein the show effect devices are actuated to generate show effects in response to receipt of the show control signals.

8. The system of claim 7, wherein the onboard show controller receives location information for a second UAV in the space and, in response, inhibits the show effects through modified operation of at least one of the show effect devices determined to present a potential hazard to the second UAV.

9. The system of claim 7, wherein the onboard show controller responds to an abnormal condition on the vehicle by activating one or more of the show effect devices comprising lighting devices to enhance visibility of the UAV or the thematic cladding to an observer of the air space.

10. The system of claim 7, wherein the onboard show controller responds to received user input to place the onboard show system in maintenance safety mode in which at least one of the show effect devices is inoperable or has reduced operation intensity.

11. The system of claim 7, wherein the onboard show controller generates the show control signals to provide indication of an operating status of the UAV.

12. The system of claim 7, wherein the onboard show controller receives location information of one or more additional UAV in the space within a predefined distance to the UAV and wherein the onboard show controller responds by determining the one or more additional UAV is in a foreground portion of the space and by generating the show control signals to reduce brightness of at least one of the show effect devices generating light.

13. The system of claim 7, wherein the onboard show controller receives location information of one or more additional UAV in the space within a predefined distance to the UAV and wherein the onboard show controller responds by modifying timing of generating at least a subset of the show control signals to synchronize timing of one or more of the show effects with movement of the one or more additional UAV in the space.

14. A system adapted for providing a themed aerial vehicle entertainment platform with dynamic aerial show coordination, comprising:
- an unmanned aerial vehicle (UAV) comprising a chassis, flight propulsion mechanisms, and a flight controller controlling the flight propulsion mechanisms to move the UAV in an airspace;
- thematic cladding supported by the chassis and disguising presence of the UAV;
- an onboard show system including show effect devices in or on the thematic cladding; and
- an onboard show controller supported by the UAV,
- wherein the onboard show controller includes a show control module and memory storing first and second scripts defining timing and locations for operating the show effect devices as the UAV moves through the airspace,
- wherein the show control module generates show control signals, based on monitoring of movement of the UAV through the airspace compared to the defined timing and locations, to actuate the show effect devices to generate show effects in response to receipt of the show control signals, and
- wherein the show control module selects and follows the first script or the second script based on results of the monitoring, whereby dynamic show control is provided by the show control module.

15. The system of claim 14, wherein the show control module processes real-time performance parameters for the UAV and, in response to determining the UAV is more than a predefined distance from a location on the ground below the airspace, dims brightness of onboard illumination provided by one or more of the show effect devices.

16. The system of claim 14, wherein the show control module processes real-time performance parameters for the UAV and, in response to determined values of one or more of the performance parameters, ramps brightness of illumination provided by one or more of the show effect devices up or down.

17. The system of claim 14, wherein a subset of the show effect devices is operable to illuminate surfaces of the thematic cladding and wherein the show control module processes real-time performance parameters for the UAV and, in response to determining an orientation of the UAV based on the real-time performance parameters, adjusts illumination provided by one or more of the show effect devices to reduce amount of light directed toward observers of the airspace.

* * * * *